United States Patent [19]

Kim

[11] Patent Number: 5,895,022

[45] Date of Patent: Apr. 20, 1999

[54] MONITOR SUPPORT ADJUSTING APPARATUS

[75] Inventor: Boo Seob Kim, Kyoungsangbuk-Do, Rep. of Korea

[73] Assignee: LG Electronics, Inc., Seoul, Rep. of Korea

[21] Appl. No.: 08/687,139

[22] Filed: Jul. 24, 1996

[30] Foreign Application Priority Data

Jul. 31, 1995 [KR] Rep. of Korea ............... 95 19663 U

[51] Int. Cl.[6] .............................................. A45D 19/04
[52] U.S. Cl. ................ 248/398; 248/183.2; 248/921; 248/349.1
[58] Field of Search ........................ 248/917, 918, 248/919, 920–923, 183.2, 349.1, 371, 346.01, 179.1, 346.03, 346.04, 346.06

[56] References Cited

U.S. PATENT DOCUMENTS

| 4,589,713 | 5/1986 | Pfuhl .................................. 248/349.1 |
| 4,591,120 | 5/1986 | Bryant-Jeffries et al. .......... 248/179.1 |
| 4,852,830 | 8/1989 | Howard ............................... 248/183.2 |
| 5,518,216 | 5/1996 | Wu ...................................... 248/923 |
| 5,564,669 | 10/1996 | Wu ................................... 248/346.01 |
| 5,632,463 | 5/1997 | Sung et al. ......................... 248/371 |

Primary Examiner—Leslie A. Braun
Assistant Examiner—Gwendolyn Baxter
Attorney, Agent, or Firm—Christie, Parker & Hale, LLP

[57] ABSTRACT

A monitor support adjusting apparatus which can stably and smoothly support a monitor to be rotatable in upward, downward, left, and right directions. The apparatus includes a base, a rotatable supporting part rotatably mounted on an upper surface of the base, a slidable supporting part slidably mounted on an upper surface of the rotatable supporting part and having fixing members for fixing a monitor body to the slidable supporting part, a first connecting section for connecting the rotatable supporting part to the base to be rotatable in left and right directions on the base, and a second connecting section for connecting the slidable supporting part to the rotatable supporting part to be rotatable in upward and downward directions on the rotatable supporting part.

4 Claims, 4 Drawing Sheets

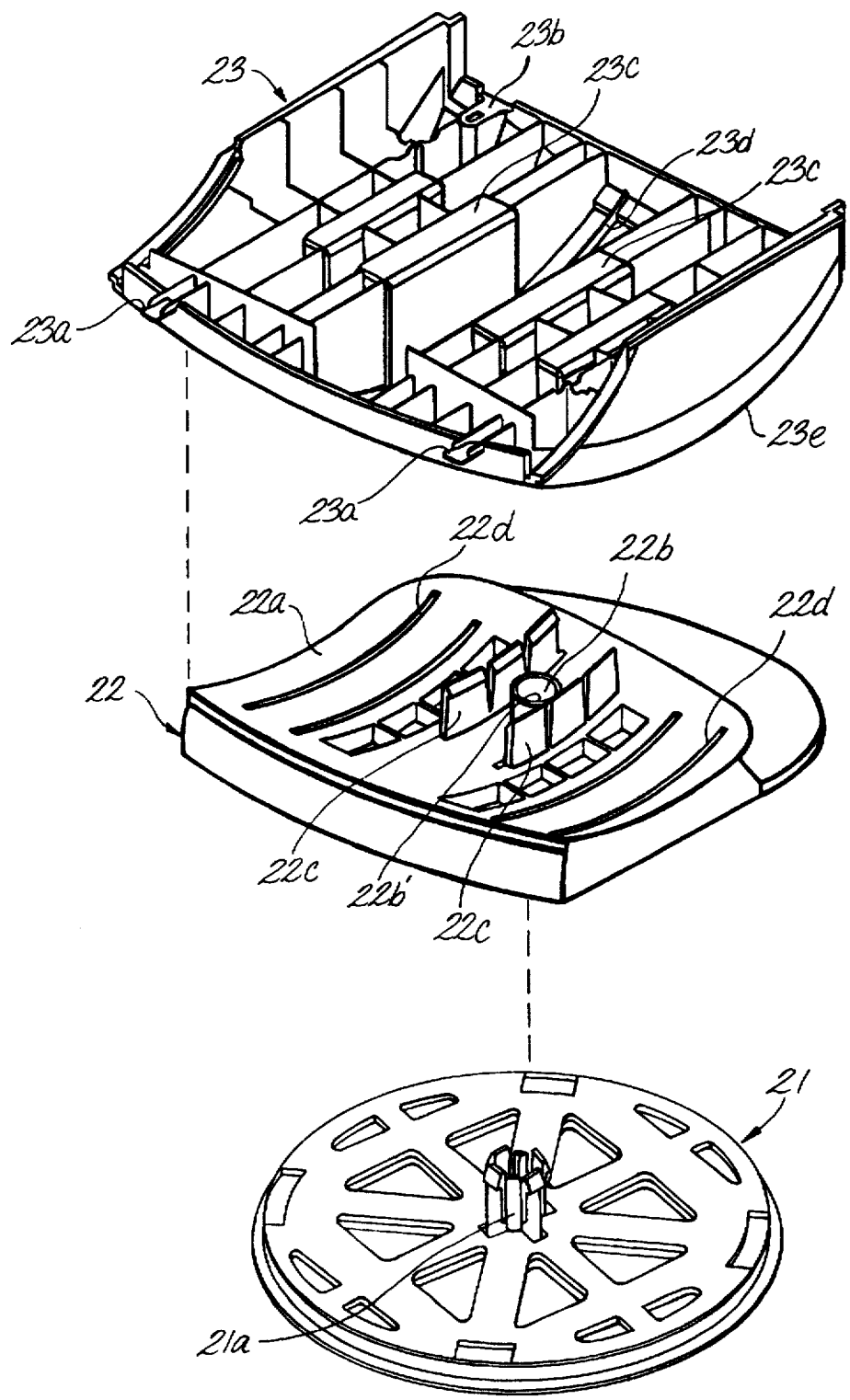

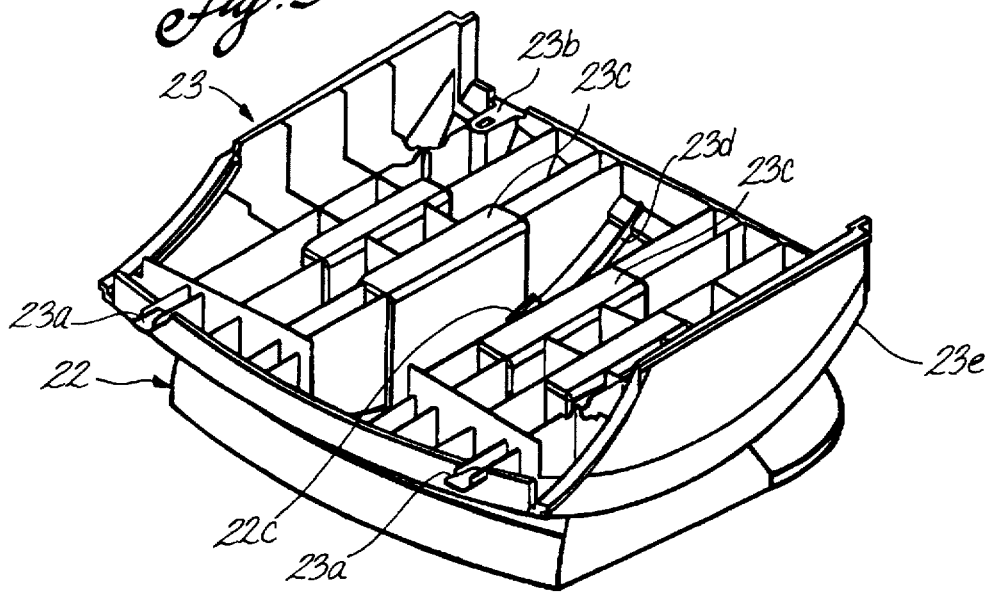
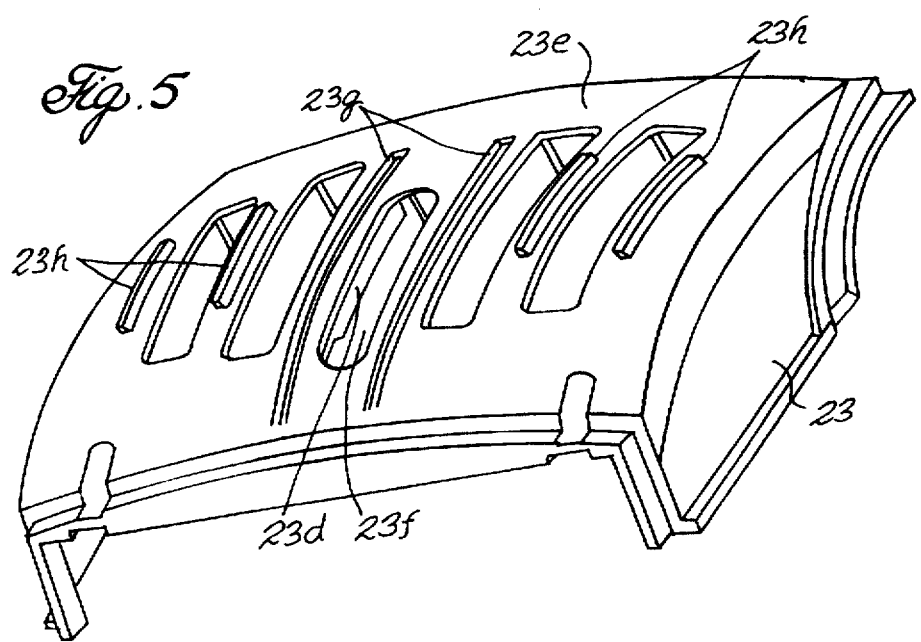

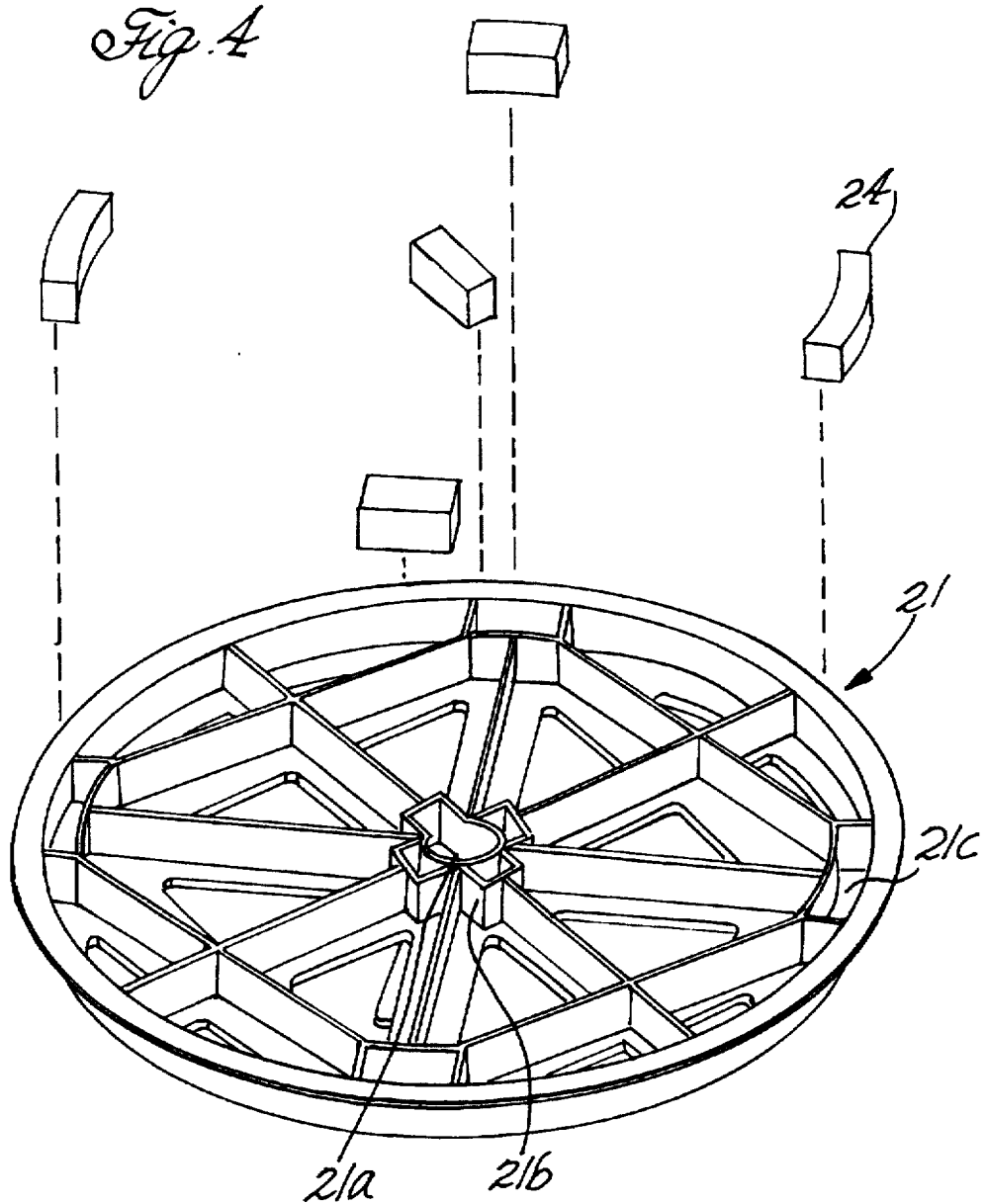

5,895,022

MONITOR SUPPORT ADJUSTING APPARATUS

BACKGROUND OF THE INVENTION

1. Field of the Invention

The present invention relates to a monitor support adjusting apparatus for a video appliance such as a computer, a television receiver, etc., and more particularly to a monitor support adjusting apparatus which can stably and smoothly support a monitor to be rotatable in an upward, downward, left, or right direction by improving the structure of the monitor support.

2. Description of the Prior Art

Generally, a monitor support is provided with an adjusting apparatus for adjusting the monitor in upward, downward, left, and right directions for a user's convenience.

FIGS. 1A and 1B show the structure of a conventional monitor support adjusting apparatus. Referring to FIGS. 1A and 1B, the conventional monitor support adjusting apparatus comprises a base 1 having a boss 6 projected upwardly from a center portion of the base 1, a rotatable supporting part 2 for supporting a monitor, the rotatable supporting part 2 being in spherical contact with an upper surface of the base 1 so as to be rotatable about the boss 6 in upward, downward, left, and right directions, a clamping connector 3 for connecting the base 1 and the rotatable supporting part 2 together, and a bolt 4 inserted through the rotatable supporting part 2 and the connector 3 to be bolt-fastened to the boss 6 of the base 1.

To the bottom surface of the base 1, rubber plates 5 for the prevention of skidding are attached, and to the boss 6 thereof, the bolt 4 is fastened after being inserted through the connector 3 and the rotatable supporting part 2.

As shown in FIG. 1B, the upper surface of the base 1 has a concave shape, and the bottom surf ace of the rotatable supporting part 2 has a convex shape, so that the two surfaces are in spherical contact with each other. On the bottom surface of the rotatable supporting part 2, an elongated guide hole 7 through which the boss 6 is to be inserted is formed, so that the boss 6 moves along the elongated guide hole 7 for adjusting the tilting angle of the rotatable supporting part 2 in upward and downward directions. On the upper portion of the rotatable supporting part 2, latches 8 and escape preventing shucks 9 are formed to interconnect the rotatable supporting part 2 on the monitor.

According to the conventional monitor support adjusting apparatus, the rotatable supporting part 2 and the base 1 are in spherical contact with each other, and the connector 3 is resiliently secured to the rotatable supporting part 2 by the bolt 4. Thus, the supporting part 2 is rotatable about the boss 6 in left and right directions. Further, the tilting angle of the supporting part 2 in upward and downward directions is adjusted by the movement of the boss 6 along the elongated guide hole 7. Practically, the spherical contact area of the supporting part 2 and the bass 1 is determined to be less than a half diameter of the monitor body to achieve a smooth adjustment of the monitor support.

However, the conventional monitor support adjusting apparatus has drawbacks in that since the base 1 and the supporting part 2 are fastened together by a separate connector 3 and bolt 4, its fastening work is complicated to deteriorate its productivity in a monitor assembling process. Further, since the spherical contact area of the supporting part 2 and the base 1 is relatively small, the monitor is apt to tremble during the adjustment of the monitor body and the supporting part 2 in upward, downward, left, and right directions due to the weight of the monitor itself and the weak structure of the connector 3.

It is an object of the present invention to solve the problems involved in the prior art, and to provide a monitor support adjusting apparatus which can improve its productivity by each component's own structure resiliently assembled together without using a separate connector or a fastening bolt.

SUMMARY OF THE INVENTION

It is another object of the present invention to provide a monitor adjusting apparatus which can achieve a stable and smooth adjustment of the monitor in upward, downward, left, and right directions.

In order to achieve the above objects, the present invention provides a monitor support adjusting apparatus comprising:

a base;

rotatable supporting means rotatably mounted on an upper surface of said base;

slidable supporting means slidably mounted on an upper surface of said rotatable supporting means, and having fixing means for fixing a monitor body to said slidable supporting means;

a first connecting means for connecting said rotatable supporting means to said base to be rotatable in left and right directions on said base; and a second connecting means for connecting said slidable supporting means to said rotatable supporting means to be rotatable in upward and downward directions on said rotatable supporting means.

Preferably, the upper surface of said rotatable supporting means is in spherical contact with a bottom surface of said slidable supporting means.

The first connecting means may comprise a resilient hook portion formed on said upper surface of said base, and a connecting tube formed on a center portion of said rotatable supporting means for being resiliently interlocked with said hook portion.

The second connecting means may comprises a plurality of connecting strips formed on predetermined portions of said slidable supporting means, and a plurality of connecting strip hangers, formed on said rotatable supporting means, for being engaged with said connecting strips.

BRIEF DESCRITPION OF THE DRAWINGS

The above objects, other features, and advantages of the present invention will become more apparent by describing the preferred embodiment thereof with reference to the accompanying drawings, in which:

FIG. 2 is an exploded perspective view of the monitor support adjusting apparatus according to the present invention.

Figure 1A:
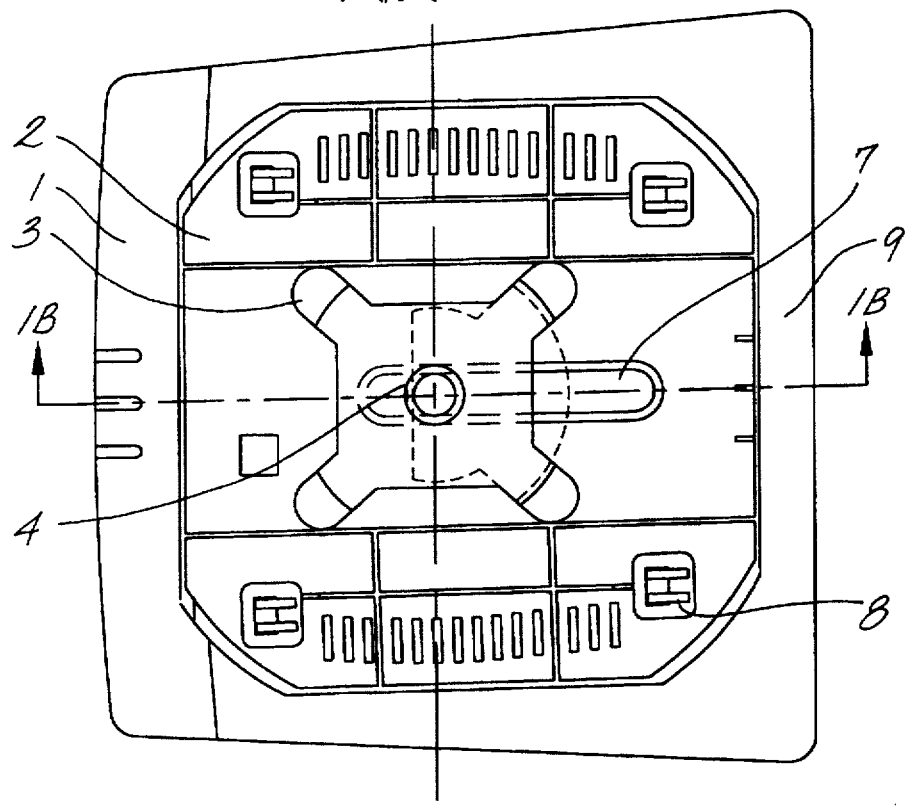
FIG. 1A is at an view of a conventional monitor support adjusting apparatus.
Figure 1B:
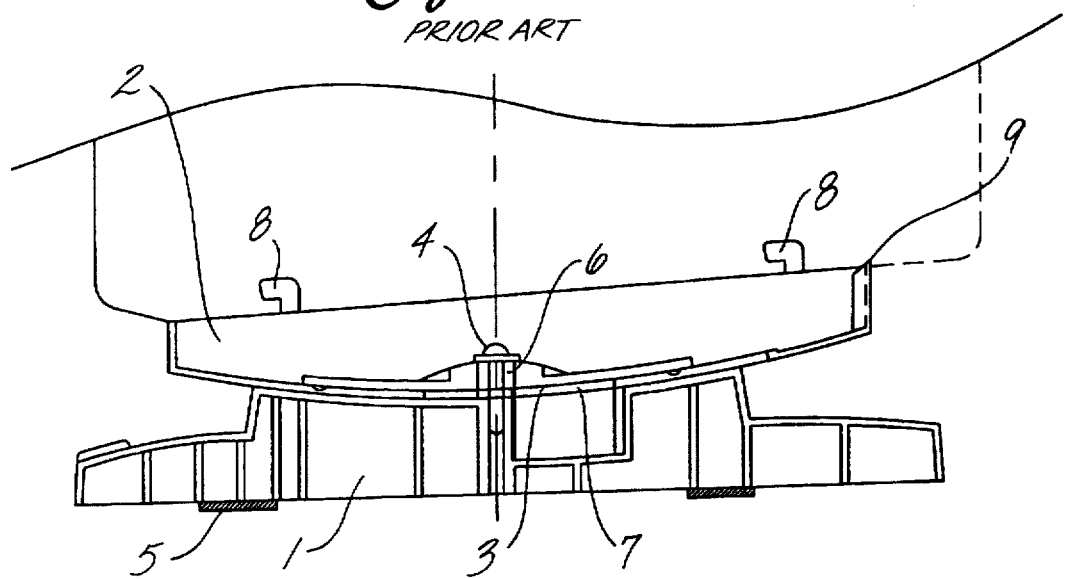
FIG. 1B is a sectional view of the apparatus of FIG. 1A taken along the line 1B—1B.

FIG. 3 perspective view of the monitor support adjusting apparatus in an assembled state according to the present invention:

FIG. 4 is a bottom view of the base in the monitor support adjusting apparatus according to the present invention.

FIG. 5 is a bottom view of in the slidable supporting part in the monitor support adjusting apparatus according to the present invention.

DETAILED DESCRIPTION OF THE EMBODIMENT

FIG. 2 is an exploded perspective view of the monitor support adjusting apparatus according to the present invention. FIG. 3 is a perspective view of the apparatus of FIG. 2 in an assembled state.

Referring to FIGS. 2 and 3, the monitor support adjusting apparatus according to the present invention is provided with a base 21 having a resilient hook portion 21a form on the center upper surface of the base 21 and extending upwardly with a predetermined height, a rotatable supporting part 22 rotatably mounted on the upper surface of the base 21, a slidable supporting part 23 slidably mounted on the upper surface of the rotatable supporting part 22 and having fixing members composed of a plurality of lugs 23a and screw-fastening holes 23b for fixing a monitor body to the slidable supporting part 23, a first connecting means for resiliently connecting the rotatable supporting part 22 to the base 21 so that the rotatable supporting part 22 is rotatable on the base 21 in left and right directions, and a second connecting means for connecting the slidable supporting part 23 to the rotatable supporting part 22 so that the slidable supporting part 23 is rotatable on the rotatable supporting part 22 in upward and downward directions.

The slidable supporting part 23 is provided with lugs 23a and screw-fastening holes 23b for fixing the monitor body to the slidable supporting part 23, and connecting strips 23d and guide ribs 23h formed thereon.

The rotatable supporting part 22 is provided with a connecting tube 22b for being resiliently interlocked with the resilient hook portion 21a of the base 21, connecting strip hangers 22c for being engaged with the connecting strips 23d of the slidable supporting part 23, respectively, and an elongated guide hole 22f formed on the center of the rotatable supporting part 22 through which the resilient hook portion 21a of the base 21 is inserted. Thus, the base 21, rotatable supporting part 22, and slidable supporting part 23 are interlocked, and assembled into engagement with one another.

On the upper center surface of the base 21, the resilient hook portion 21a is formed, extending upwardly with a predetermined height, serving to act as a shaft in left and right rotations of the rotatable supporting part 22. On the bottom surface thereof, a plurality of grooves 21c are formed to which a plurality of spacing ribs 21b and anti-skid rubber plates 24 are inserted and attached, respectively, as shown in FIG. 4.

As shown in FIG. 2, the plane exterior of the rotatable supporting part 22 is roughly of a rectangular shape, and its upper surface provides a concave slidable surface 22a. On the upper portion of the rotatable supporting part 22, the connecting tube 22b for receiving and being resiliently interlocked with the hook portion 21a of the base 21, the connecting strip hangers 22c and the guide grooves 22d for being interlocked with the connecting strips 23d and the guide ribs 23h, respectively, are formed to permit the adjustment of the monitor in upward and downward directions. Here, the size and the number of the connecting strip hangers 22c and the guide grooves 22d may be determined according to the size and the design of the monitor.

At the corners of the slidable supporting part 23, the lugs 23a and the screw-fastening holes 23b for tying the monitor body to the slidable supporting part 23 are formed. At the center portion of the slidable supporting part 23, two monitor body supporters 23c and the connecting strips 23d for being interlocked with the connecting strip hangers 22c of the rotatable supporting part 22 are formed.

As shown in FIG. 5, the bottom surface of the slidable supporting part 23 provides a convex slidable surface 23e which is in slidable contact with the concave surface 22a of the rotatable supporting part 22. On the bottom surface of the slidable supporting part 23, the elongated guide hole 23f through which the resilient hook portion 21a of the base 21, which is interlocked with the connecting tube 22b of the rotatable supporting part 22, is inserted. Also, guide slots 23g for guiding the connecting strip hangers 22c of the rotatable supporting part 22 to pass therethrough so that the connecting strip hangers 22c are resiliently interlocked with the connecting strips 23d of the slidable supporting part 23, and the guide ribs 23h for being inserted in the guide grooves 22d of the rotatable supporting part 22 are formed on the bottom surface of the slidable supporting part 23.

The assembled state of the monitor support adjusting apparatus according to the present invention as constructed above is illustrated in FIG. 3. The rubber plates 24 attached to the bottom of the base 4 serves to prevent the assembled monitor support from skidding on a desk or a table. The resilient hook portion 21a of the base 21 passes through the connecting tube 22b of the rotatable supporting part 22, and is interlocked with the upper end portion 22b' of the connecting tube 22b to firmly tie the base 21 and the rotatable supporting part 22 together.

Meanwhile, the concave upper surface 22a of the rotatable supporting part 22 and the convex bottom surface of the slidable supporting part 23 are in spherical contact with each other. It is preferable that the contacted area has a rectangular shape to support the monitor body stably. Also, since the resilient hook portion 21a of the base 21, which passes through the connecting tube 22b of the rotatable supporting part 22, is located within the elongated guide hole 23f of the slidable supporting part 23, the slidable supporting part 23 together with the rotatable supporting part 22 can rotate about the resilient hook portion 21a in left and right directions, permitting the adjustment of the monitor in a left and right direction.

Further, the connecting strip hangers 22c of the rotatable supporting part 22 passes through the guide slots 23g and are interlocked with the upper ends of the connecting strips 23d, respectively, to connect the slidable supporting part 23 to the rotatable supporting part 22. At this time, the guide ribs 23h of the slidable supporting part 22 are inserted into the guide grooves 22d of the rotatable supporting part 22, causing the slidable supporting part 23, which is in spherical contact with the upper surface of the rotatable supporting part 22, to rotate in upward and downward directions.

Specifically, if a user tilts the monitor upward or downward in a state that the monitor body is fixed to the slidable supporting part 23 by the lugs 23a and the screw-fastening holes 23b, the guide ribs 23h slide along the guide grooves 22d, respectively, causing the slidable supporting part 23 to rotate in upward and downward directions. At this time, the connecting strip hangers 22c also slide, being guided by the connecting strips 23d, respectively, to permit a stable and accurate adjustment of the slidable supporting part 23.

From the foregoing, it will be apparent that the monitor support adjusting apparatus according to the present invention provides advantages in that its productivity can be improved by its own assembled structure without using a separate connector or a fastening bolt. Further, since the contacted area of the rotatable supporting part and the slidable supporting part has a rectangular shape, a stable and smooth adjustment of the monitor in upward, downward, left, and right directions can be achieved without trembling the monitor during its adjusting operation.

While the present invention has been described and illustrated herein with reference to the preferred embodiment thereof, it will be understood by those skilled in the art that various changes in form and details may be made therein without departing from the spirit and scope or the invention.

What is claimed is:

1. A monitor support adjusting apparatus comprising:

a base;

a rotatable supporting part rotatably mounted on an upper surface of said base and including a plurality of connecting strip hangers;

a slidable supporting part slidably mounted on an upper surface of said rotatable supporting part, having fixing means for fixing a monitor body to said slidable supporting part and including a plurality of connecting strips for interlocking with said plurality of connecting strip hangers to connect the slidable supporting part to said rotatable supporting part;

a first connecting means for connecting said rotatable supporting part to said base and adapted to allow rotation of the rotatable supporting part in left and right directions relative to the base, said first connecting means including a resilient hook portion formed on the upper surface of the base, and a connecting tube formed on a center portion of the rotatable supporting part, the center portion adapted for interlocking with the hook portion to movably connect the rotatable supporting part to the base; and a second connecting means for connecting said slidable supporting part to said rotatable supporting part and adapted to allow rotation of the slidable supporting part in upward and downward directions relative to the rotatable supporting part, the second connecting means including a plurality of guide grooves formed on the upper surface of the rotatable supporting part, and a plurality of guide ribs formed on a bottom surface of the slidable supporting part, for being inserted into the plurality of guide grooves, respectively; and wherein the upper surface of the rotatable supporting part has a semi-spherical concave shape and is in semi-spherical sliding contact with a bottom surface of the slidable supporting part which has a semi-spherical convex shape corresponding to the semispherical concave shape of said upper surface of said rotatable supporting part.

2. A monitor support adjusting apparatus as claimed in claim 1, wherein said fixing means of said slidable supporting means comprises a plurality of lugs for fixing said monitor body to said slidable supporting means.

3. The monitor support adjusting apparatus as recited in claim 1, wherein the contacting areas of said upper surface of said rotatable supporting part and said bottom surface of said slidable supporting part define a rectangular shape.

4. The monitor support adjusting apparatus as claimed in claim 1, wherein the plurality of connecting strip hangers are integrally formed on the rotatable supporting part.

* * * * *

UNITED STATES PATENT AND TRADEMARK OFFICE
CERTIFICATE OF CORRECTION

PATENT NO. : 5,895,022
DATED : April 20, 1999
INVENTOR(S) : Boo Seob Kim

It is certified that error appears in the above-identified patent and that said Letters Patent is hereby corrected as shown below:

Column 1, line 37, replace "surf ace" with -- surface --.
Column 2, line 10, move "SUMMARY OF THE INVENTION" from line 10 and put before the paragraph on line 4 beginning with "It is an object . . . ."
Column 2, line 53, replace "is at an view" with -- is a top plan view --.
Column 2, line 60, after "FIG. 3" insert -- is a --.
Column 2, line 65, after "view of" delete "in".
Column 3, line 1, replace "DETAOLED" with -- DETAILED --.
Column 3, line 9, replace "form" with -- formed --.
Column 3, line 31, after "base 21," insert -- and a plurality of --.
Column 3, line 33, replace "respectively," with -- respectively. --.
Column 3, lines 34-36, delete ", and an elongated guide hole 22f formed on the center of the rotatable supporting part 22 through which the resilient hook portion 21a of the base is inserted."
Column 4, line 18, replace "base 4" with-- base 21 --.
Column 5, line 5, replace "scope or" with -- scope of --.
Column 6, line 18, replace "A monitor" with -- The monitor --; and replace "as claimed" with -- as recited --.
Column 6, line 20, replace "means comprises" with -- part comprises --.

UNITED STATES PATENT AND TRADEMARK OFFICE
CERTIFICATE OF CORRECTION

PATENT NO. : 5,895,022
DATED : April 20, 1999
INVENTOR(S) : Boo Seob Kim

It is certified that error appears in the above-identified patent and that said Letters Patent is hereby corrected as shown below:

Column 6, line 21, replace "means" with -- part --.
Column 6, line 26, replace "as claimed" with -- as recited --.

Signed and Sealed this

Twentieth Day of March, 2001

*Attest:*

NICHOLAS P. GODICI

*Attesting Officer*  *Acting Director of the United States Patent and Trademark Office*